(12) United States Patent
Cao et al.

(10) Patent No.: US 9,996,506 B2
(45) Date of Patent: Jun. 12, 2018

(54) IDENTIFYING FONTS USING CUSTOM LIGATURES

(71) Applicant: International Business Machines Corporation, Armonk, NY (US)

(72) Inventors: Ying Cao, Beijing (CN); Zhi Chen, Beijing (CN); Sheng Liang Han, Beijing (CN); Yin Xia, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 157 days.

(21) Appl. No.: 14/950,429

(22) Filed: Nov. 24, 2015

(65) Prior Publication Data

US 2017/0147535 A1   May 25, 2017

(51) Int. Cl.
*G06F 17/21* (2006.01)
*G06F 3/0484* (2013.01)

(52) U.S. Cl.
CPC ........ *G06F 17/214* (2013.01); *G06F 3/04842* (2013.01)

(58) Field of Classification Search
CPC ...................................................... G06F 17/21
USPC ...................................................... 715/271
See application file for complete search history.

(56) References Cited

U.S. PATENT DOCUMENTS

| | | | |
|---|---|---|---|
| 6,754,875 B1* | 6/2004 | Paradies | G06F 17/211 715/262 |
| 8,615,709 B2 | 12/2013 | Lee | |
| 8,643,652 B2 | 2/2014 | Kaplan | |
| 8,769,050 B2 | 7/2014 | Bacus et al. | |
| 2005/0219218 A1* | 10/2005 | Harman | G06F 3/018 345/169 |
| 2014/0136957 A1 | 5/2014 | Kaasila et al. | |
| 2014/0195903 A1* | 7/2014 | Kaasila | G06F 17/214 715/269 |
| 2015/0100882 A1 | 4/2015 | Severenuk et al. | |

FOREIGN PATENT DOCUMENTS

| | | |
|---|---|---|
| CN | 102063483 A | 5/2011 |
| EP | 2849086 A2 | 3/2015 |
| WO | 2014151668 A1 | 9/2014 |

* cited by examiner

*Primary Examiner* — Kavita Padmanabhan
*Assistant Examiner* — Tionna Burke
(74) *Attorney, Agent, or Firm* — Daniel R. Simak

(57) ABSTRACT

A method for identifying a font displayed within an electronic document. In one embodiment, the method includes a computer processor identifying a string of two or more characters that correspond to a custom ligature within an electronic document, wherein the custom ligature is associated with at least one character of the electronic document. The method further includes accessing a font library associated with the electronic document. The method further includes identifying a font file within the font library that corresponds to the at least one character of the electronic document that is associated with the custom ligature. The method further includes identifying a glyph within the identified font file that corresponds to the custom ligature. The method further includes substituting the identified glyph into the electronic document to replace at least the custom ligature. The method further includes displaying the substituted glyph within the electronic document.

19 Claims, 5 Drawing Sheets

IDENTIFYING FONTS USING CUSTOM LIGATURES

BACKGROUND OF THE INVENTION

The present invention relates generally to the field of typography, and more particularly with typography within electronic document.

There are over 150,000 typefaces in existence. In some cases, typeface and font can be used interchangeably. In other cases, a typeface may be known as a font family with each font further characterized by a weight, a style, condensation, width, slant, italicization, ornamentation, etc. Fonts are no longer constrained by the restrictions of early computing technologies that had limited display resolution and printing resolution capabilities. Tens of thousands of typefaces have been converted into digital formats, such as TrueType™ fonts. Some digital fonts (i.e., fonts) are considered common fonts that are generally available within various computing devices, such as desktop personal computers (PCs), laptop computers, smartphones, etc. These fonts may be included in libraries associated with an operating system of a computing device. Other fonts can be specific to a software program on a computing device.

Various fonts are chosen for functionality, such as screen fonts, whereas other fonts are chosen for visual impact. Fonts are utilized within many electronic (e.g., digital) documents, such as webpages, e-mails, presentations, desktop publishing, spreadsheets, calendars, etc. Some fonts include the characters, symbols, and glyphs associated with multiple human languages. Other fonts may be unique to a specific human language. Designers and individuals can create fonts with specific characterizes. Some fonts are available free of charge. Other fonts may be purchased or licensed.

SUMMARY

According to aspects of the present invention, there is a method, computer program product, and/or system for identifying a font displayed within an electronic document. In an embodiment, the method includes one or more computer processors identifying a font displayed within an electronic document. The method further includes one or more computer processors identifying a string of two or more characters that correspond to a custom ligature within an electronic document, wherein the custom ligature is associated with at least one character of the electronic document. The method further includes one or more computer processors accessing a font library associated with the electronic document. The method further includes one or more computer processors identifying a font file within the font library that corresponds to the at least one character of the electronic document that is associated with the custom ligature. The method further includes one or more computer processors identifying a glyph within the identified font file that corresponds to the custom ligature. The method further includes one or more computer processors substituting the identified glyph into the electronic document to replace at least the custom ligature. The method further includes one or more computer processors displaying the substituted glyph within the electronic document.

DETAILED DESCRIPTION

Figure 1:
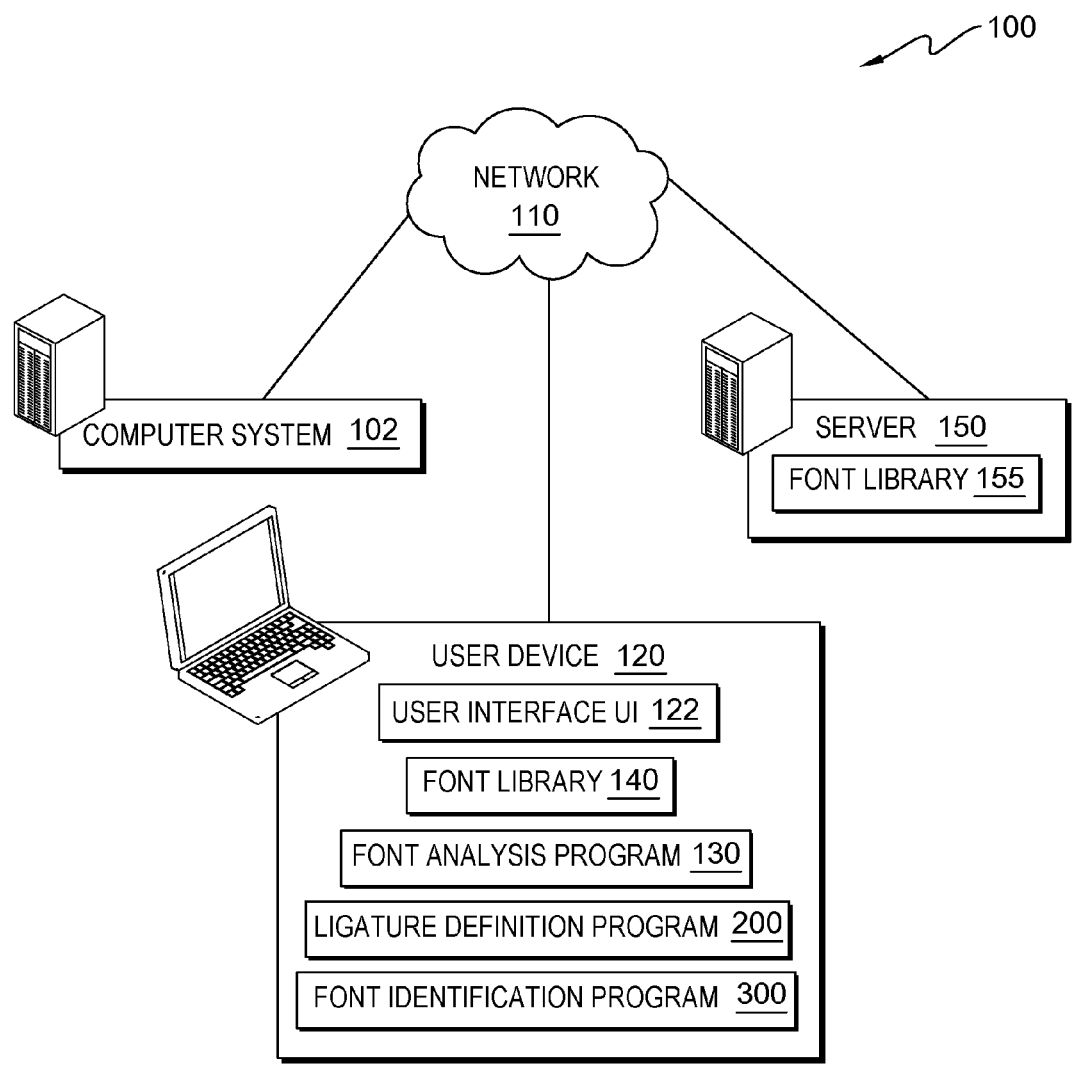
FIG. 1 illustrates a distributed computing environment, in accordance with an embodiment of the present invention.

Embodiments of the present invention recognize that web browsers and other software programs may dictate which font is used to display an electronic document, such as a webpage. An electronic device (e.g., a laptop, a smartphone, a tablet computer, etc.) of a user may not have access to some of the fonts utilized by an electronic document. Cascading style sheets (CSS) associated with a webpage may include rules that control which fonts are displayed and a priority for font substitutions if an electronic device of a user does not have access to one or more fonts associated with an electronic document. For example, a user may view the hypertext markup language (HTML) code of a webpage to determine which font a portion of text is designed to display as (e.g., a font setting), but the HTML code does not guarantee the webpage displays as designed. Viewing a CSS associated with a webpage may identify a font family (e.g., monospace) as opposed to a specific font. Similarly, a web browser plug-in or an HTML layout engine may provide an indication for a font that is associated with a portion of text in a webpage; however, the font indicated for a portion of text may not be guaranteed.

Embodiments of the present invention recognize that font files enable a user to define a string of characters as a ligature and to subsequently assign (e.g., substitute) one or more glyphs for the ligature.

Embodiments of the present invention utilize one or more custom ligature strings (e.g., strings of characters) defined within a font file to access a glyph that depicts a name of a font. An embodiment of the present invention utilizes American Standard Code for Information Interchange (ASCII) characters to define a custom ligature string that is utilized to initiate the display of a glyph designed to depict the name of a font associated with one or more characters within an electronic document that are selected by a user. Some embodiments of the present invention may be more granular and include font names that are further defined with respect to an attribute of a font family, such as bold, italic, oblique, regular, size, etc. Alternative embodiments of the present invention may utilize unicode encoding and/or other encoding methods (e.g., Atl codes, ISCII, etc.) for the characters of a custom ligature string.

One embodiment of the present invention utilizes a custom ligature string that is input (e.g., inserted) by a user within an electronic document while the electronic document is editable. Another embodiment of the present invention may automatically insert a custom ligature string within an electronic document based on an insertion point dictated by a user. Some embodiments of the present invention may utilize a hot-key combination to determine that an insertion point is utilized for the identification of a font. Other embodiments of the present invention may respond to various methods employed by a user to select one or more characters for a font analysis.

Other embodiments of the present invention may be implemented as one or more programs and/or software applications in and of themselves. Various embodiments of the present invention may analyze (e.g., identify) a font associated with one or more selected characters of an electronic document without the displayed electronic document being editable, which may improve the speed and accuracy for identifying a font. For example, an embodiment of the present invention may be implemented as a widget that can obtain metadata associated with text of a displayed electronic document that is selected by a user and display the resultant glyph that depicts a name of a font corresponding to the selected text of the electronic document.

The present invention will now be described in detail with reference to the Figures. FIG. 1 is a functional block diagram illustrating distributed computing environment 100 in an embodiment, in accordance with the present invention. In an embodiment, distributed computing environment 100 includes: computer system 102, user device 120, and server 150, all interconnected over network 110. Many modifications to the depicted environment may be made by those skilled in the art without departing from the scope of the invention as recited by the claims.

Computer system 102, user device 120, and server 150 may be: laptop computers, tablet computers, netbook computers, personal computers (PC), desktop computers, personal digital assistants (PDA), smart phones, wearable devices (e.g., digital eyeglasses, smart glasses, smart watches, personal fitness devices, personal safety devices), or any programmable computer systems known in the art. In certain embodiments, computer system 102, user device 120, and server 150 represent computer systems utilizing clustered computers and components (e.g., database server computers, application server computers, etc.) that act as a single pool of seamless resources when accessed through network 110, as is common in data centers and with cloud-computing applications. In general, computer system 102, user device 120, and server 150 are representative of any programmable electronic device or combination of programmable electronic devices capable of executing machine-readable program instructions and communicating with users of computer system 102, user device 120, and server 150, via network 110. Computer system 102, user device 120, and server 150 may include components, as depicted and described in further detail with respect to FIG. 5, in accordance with embodiments of the present invention.

Computer system 102 may host one or more websites. In an embodiment, computer system 102 includes: various webpages, programs, and databases (e.g., a website interface, an e-mail server, document files, presentations, etc.) (not shown).

User device 120 may include: user interface (UI) 122, font analysis program 130, font library 140, ligature definition program 200, font identification program 300, and various programs and electronic documents (not shown). Examples of programs that user device 120 may potentially include are: a web browser, a file manager, a font manager, a font widget, and an office productivity suite of programs (e.g., a word processor, a graphic program, a presentation program, an e-mail program, etc.). Some programs of user device 120 may generate a variety of electronic documents that are stored on user device 120. User device 120 may also receive one or more electronic documents (e.g., webpages) via network 110. A user of user device 120 can interact with UI 122 via a singular interface device, such as a touch screen (e.g., display) that performs both input to a graphical user interface (GUI) and as an output device (e.g., a display) presenting a plurality of icons associated with software apps or images depicting the executing software apps. Optionally, a software application (e.g., a web browser) can generate UI 122 operating within the GUI of user device 120.

UI 122 accepts input from a plurality of input/output (I/O) devices including, but not limited to, a tactile sensor interface (e.g., a touch screen, a touchpad) or a natural user interface (e.g., voice control unit, motion capture device, vision tracking, etc.). An I/O device interfacing with a UI 122 may be connected to an instance of user device 120, which may operate utilizing a wired connection, such as a universal serial bus port (USB™ port) or wireless network communications (e.g., infrared, NFC, etc.). For example, an I/O device may be a peripheral, such as a keyboard, a mouse, a trackball, or a click wheel that provides input from a user. A user may utilize an instance of an interface screen of UI 122 that is generated by font analysis program 130.

In one embodiment, font analysis program 130 executes on user device 120. In one scenario, font analysis program 130 is browser extension (e.g., plug-in, add-on, font widget, etc.) for a web browser. In an example, font analysis program 130 appears in a toolbar of an instance of UI 122 that is associated with a web browser. In other scenario, font analysis program 130 is a program in and of itself, such a software widget that may be activated by a hot-key combination and/or activated from the GUI of user device 120. A user may select characters (e.g., text, symbols, etc.) within an electronic document via a plurality of input devices, such as, but not limited to, a mouse (e.g., clicking, dragging, selecting, etc.); a tactile interface, a keyboard, a natural user interface, etc. In some embodiments, font analysis program 130 interfaces with font identification program 300.

In various embodiments, font analysis program 130 analyzes characters, within an electronic document, that are selected by a user. For example, font analysis program 130 may obtain metadata associated with one or more characters selected within an electronic document. In other embodiments, font analysis program 130 generates an instance of a graphical user interface (e.g., UI 122) and/or modifies the access of an electronic document, such that the electronic document is presented in an editable format. In one embodiment, font analysis program 130 may also auto-insert a custom ligature among a user selection of characters of an electronic document to determine a font associated with the characters selected by a user. In another embodiment, font analysis program 130 copies a portion of an electronic document that includes the user selection of characters to a graphical user interface. Within the graphical user interface, font analysis program 130 executes a custom ligature string insertion, initiates a glyph substitution for the custom ligature string, and displays the font name glyph associated with a font of least one character of a user selection of characters. In an alternative embodiment, font analysis program 130 may be associated with a service offered by server 150 that a user of user device 120 accesses via network 110.

Font library 140 includes one or more font files utilized by various software programs and apps that execute on user device 120. In one embodiment, font library 140 includes font files utilized by an operating system (OS) (not shown) of user device 120. In another embodiment, a font within font library 140 responds to an insertion of a font ligature string by substituting a glyph for the font ligature string that font identification program 300 displays. In various embodiments, font library 140 is accessed by programs and/or apps that execute on user device 120. In an alternative embodiment, font library 140 may be a font library that is related to a specific program or suite of programs, such as a computer-aided design and simulation program.

Ligature definition program 200 is a program that enables a user to define a custom ligature within a font style (e.g., font file) that the displays a glyph that depicts a name of a font, in accordance with an embodiment of the present invention. In some embodiments, ligature definition program 200 exists on user device 120 and modifies one or more font files within font library 140. In one scenario, ligature definition program 200 modifies one or more font files that are utilized by an OS of user device 120. Font files utilized by an OS may be utilized by a plurality of software apps of user device 120. In another scenario, ligature definition program 200 modifies one or more font files that correspond to a software program on user device 120, and the one or more font files are not accessible by other software programs of user device 120. In various scenario, ligature definition program 200 modifies one or more font files that are utilized by an OS of user device 120. In an alternative embodiment, an instance of ligature definition program 200 executes on server 150 to modify font files that include ligatures and glyphs corresponding to specific fonts within font library 155. In an alternative embodiment, ligature definition program 200 interacts with a font management program that may edit a font file.

Font identification program 300 is a program that enables a user to identify a font within an electronic document by inserting a custom ligature and displaying the resultant font name, in accordance with an embodiment of the present invention. In one embodiment, font identification program 300 interfaces with a font analysis program (e.g., font analysis program 130) to insert a custom ligature within a selected portion of text (e.g., characters, glyphs, etc.). In another embodiment, font identification program 300 may be invoke while a user accesses an electronic document via an editing mode. In some scenarios, font identification program 300 may be invoked prior to a user inserting a custom ligature string within an electronic document. In other scenarios, font identification program 300 may be invoked after a user inserting a custom ligature string within an electronic document. In various embodiments, if the custom ligature and a corresponding glyph (e.g., font name) are defined for a font (e.g., font style, font type, etc.), then font identification program 300 display the glyph that depicts the name of the font of the selected text.

In some embodiments, font identification program 300 also includes one or more capabilities related to analyzing a font, such as, but not limited to, providing a user interface (e.g., a method to select text for font analysis), rendering (e.g., displaying) some or all of an electronic document after the insertion of a custom ligature, and optionally saving at least a rendered portion of the selected text that includes a glyph that identifies a font associated with the selected text. In another embodiment, font identification program 300 may include one or more user preferences, such as a default special ligature string for fonts within font library 140, authentication information to access server 150 and/or font library 155, a special ligature string dictated for font library 155, one or more ligature/glyph substitution rules, etc.

In one embodiment, user device 120 communicates through network 110 to computer system 102. In another embodiment, user device 120 communicates through network 110 to server 150. Network 110 can be, for example, a local area network (LAN), a telecommunications network, a wireless local area network (WLAN), such as an intranet, a wide area network (WAN), such as the Internet, or any combination of the previous and can include wired, wireless, or fiber optic connections. In general, network 110 can be any combination of connections and protocols that will support communications between user device 120, computer system 102, and server 150, in accordance with embodiments of the present invention. In various embodiments, network 110 operates locally via wired, wireless, or optical connections and can be any combination of connections and protocols (e.g., personal area network (PAN), near field communication (NFC), laser, infrared, ultrasonic, etc.).

In an embodiment, server 150 includes font library 155 and may potentially include various webpages, programs, and databases (e.g., a website interface, a font management program, document files, presentations files, etc.) (not shown). In some embodiments, server 150 includes an instance of ligature definition program 200. The instance of ligature definition program 200 that executes on server 150 is utilized to modify font files for inclusion in font library 155 (e.g., add a character string corresponding to a custom ligature and associated font name glyph). In other embodiments, server 150 includes an instance of font identification program 300 and/or font analysis program 130. In an example, an instance of font identification program 300 and/or font analysis program 130 that executes on server 150 may be associated with a web browser plug-in or widget that a user may access remotely to identify the font within an electronic document. In various embodiments, server 150 may provide font library 155 and/or font analysis as a service to a user of user device 120 via network 110. In one example, server 150 and/or font library 155 are accessed and remunerated via an app installed on user device 120. In another example, server 150 and/or font library 155 may be a subscription feature of a website or web browser (e.g., a plug-in).

Figure 2:
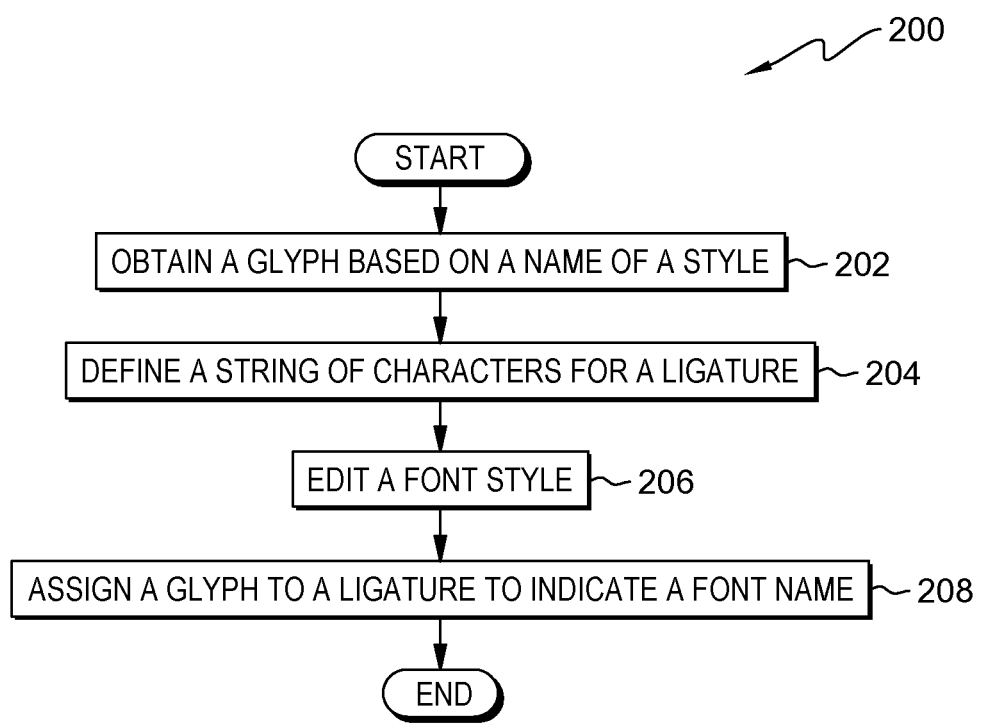
FIG. 2 depicts a flowchart of the operational steps of a ligature definition program, in accordance with an embodiment of the present invention.

FIG. 2 is a flowchart depicting operational steps for ligature definition program 200, a program that enables a user of a computing device to modify one or more font files within a font library to include a glyph based on a font name and associate the glyph with a string of characters that form a custom ligature, in accordance with embodiments of the present invention.

In step 202, ligature definition program 200 obtains a glyph based on a name of a font. In one embodiment, ligature definition program 200 obtains a glyph, such as text string, bitmap, image of text, etc., that depicts a name of a font. A glyph based on the name of a font may include one or more non-text (e.g., special characters), symbols, and/or shapes. In an example (referring to FIG. 4), glyph 463 depicts the name of the font between a pair of parenthesis, (Lucida Calligraphy). In another example, ligature definition program 200 obtains a glyph with the name of a font within a box, such as Arial . In some embodiments, ligature definition program 200 obtains a glyph in a format that has a fixed color. In other embodiments, ligature definition program 200 obtains a glyph that can change color (e.g., modifies metadata) based on an electronic document that displays the glyph.

In step 204, ligature definition program 200 defines a string of characters for a ligature. In one embodiment, ligature definition program 200 utilizes a string of characters input by a user of user device 120 to define a font ligature string (e.g., a custom ligature). In some embodiments, ligature definition program 200 dictates that a font ligature string is comprised of ASCII characters. In various embodiments, ligature definition program 200 determines that a string of characters is defined (e.g., as a rule, identified within previously edited fonts, etc.) for a custom ligature.

Ligature definition program 200 uses the defined custom ligature (e.g., string of characters, a font ligature string) for the editing of subsequent fonts. In some embodiments, ligature definition program 200 utilizes one or more rules (e.g., a ligature substitution rule, a lookup rule, a contextual substitution rule, a wildcard rule, etc.) that further defines a special ligature character string that utilizes at least one character of a string of characters by a user. In an example, ligature definition program 200 utilizes a rule that dictates that the first character that precedes a custom ligature string is utilized to create a special ligature character string.

In step 206, ligature definition program 200 edits a font file. In one embodiment, ligature definition program 200 edits a font file of font library 140. In various embodiments, ligature definition program 200 edits a font file to include a custom ligature and one or more substitution and/or contextual substitution rules. In an alternative embodiment, an instance of ligature definition program 200 executes on server 150 and edits a font file that is subsequently stored within font library 155.

In step 208, ligature definition program 200 assigns a glyph to a ligature to indicate a font name. In one embodiment, ligature definition program 200 assigns an obtained glyph associated with a font name to a custom ligature of a font file. In another embodiment, ligature definition program 200 assigns an obtained glyph associated with a font name to a special ligature string of an edited font file. In some embodiments, ligature definition program 200 obtains a glyph based on a font name and a corresponding ligature from a user of user device 120. Ligature definition program 200 stores the edited font file within a font library (e.g., font library 140). In some embodiments, ligature definition program 200 obtains a glyph based on a font name and a corresponding ligature from a user of server 150. Ligature definition program 200 may store the edited font file within a font library 155.

Figure 3:
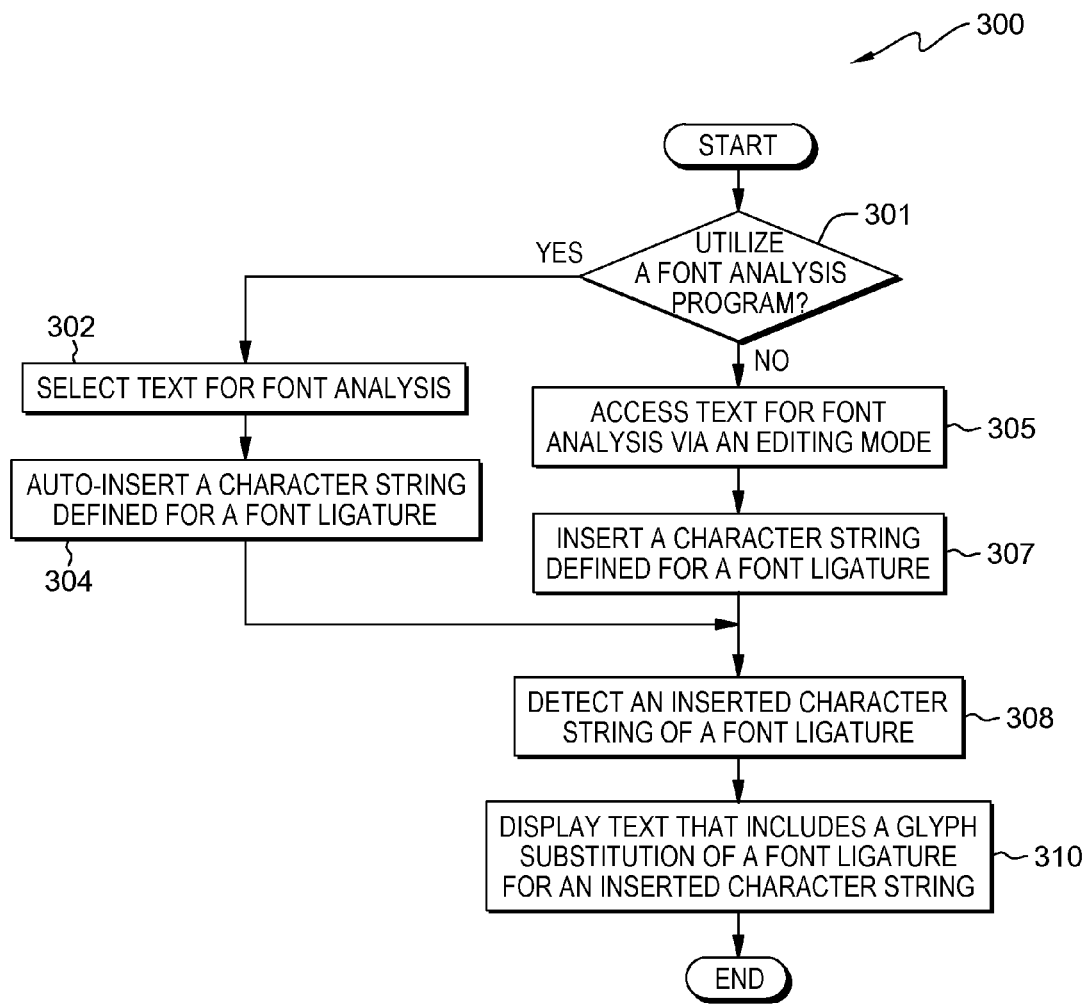
FIG. 3 depicts a flowchart of the operational steps of a font identification program, in accordance with an embodiment of the present invention.

FIG. 3 is a flowchart depicting operational steps for font identification program 300, a program for identifying a font within an electronic document based on including a custom ligature within the electronic document, in accordance with embodiments of the present invention.

In decision step 301, font identification program 300 determines whether a font analysis program is utilized. In one embodiment, font identification program 300 determines that a user utilizes a font analysis program (e.g., font analysis program 130, a font widget, etc.) on user device 120. In another embodiment, font identification program 300 determines that a user utilizes font analysis capabilities included in font identification program 300. In an alternative embodiment, font identification program 300 determines that a user utilizes a font analysis program on a computing system (e.g., server 150) accessible via network 110. In some embodiments, font identification program 300 determines that a user inputs (e.g., inserts) a custom ligature as opposed to the user utilizing a font analysis program. Responsive to determining that a font analysis program is utilized (Yes branch, decision step 301), font identification program 300 selects text for font analysis (step 302).

In step 302, font identification program 300 selects text for font analysis. In one embodiment, font identification program 300 selects characters (e.g., text, symbols, a character string, a word, etc.) within an electronic (e.g., digital) document for font analysis. In some embodiments, font identification program 300 utilizes input from a user of user device 120 to identify (e.g., select) text for analysis. In one scenario, font identification program 300 determines that a user identifies (e.g., selects) characters for font analysis based on an input device, such as a mouse, pointing device, tactile interface, etc. In an example, font identification program 300 identifies characters for font analysis based on input actions, such as, but not limited to, double click with a input pointer above the text; click and hold/drag the pointer highlighting the text; other point device gestures, etc. In another scenario, font identification program 300 determines that a user identifies (e.g., selects) characters for font analysis based on an input device setting an insertion-point (e.g., cursor) among the selected characters. In an example, font identification program 300 identifies characters within an electronic document that are selected by a user based on identifying an insertion-point among characters and a hot-key combination that activates a character selection.

In another embodiment, font identification program 300 identifies selected characters based on a find function within a program executing on user device 120. Font identification program 300 may dictate that a hot-key combination is activated to identify the found (e.g., selected) characters are subject to font analysis. In some embodiments, font identification program 300 utilizes input from a font analysis program, such as font analysis program 130 that identifies text to select for font analysis.

In step 304, font identification program 300 auto-inserts a character string defined for a font ligature. In one embodiment, font identification program 300 auto-inserts a character string, such as a font ligature string, defined by a user of user device 120. Font identification program 300 inserts a font ligature string within the selected text of an electronic document. Based on one or more user preferences, font identification program 300 can determine a position, within a selection of text, to insert a string of characters for a font ligature. In one example, font identification program 300 may insert a font ligature string after the first character of a selection of text. In another example, font identification program 300 may insert a font ligature string at the end of a selection of text (e.g., prior to a space, carriage-return, a punctuation mark, etc.) of an electronic document.

In an alternative embodiment, font identification program 300 determines that a font ligature string cannot be inserted within an electronic document. Font identification program 300 copies a portion of an electronic document that includes the user selection of character to a graphical user interface element (e.g., window, UI 122, a GUI associated with font analysis program 130, etc.). Font identification program 300 auto-inserts a font ligature string among a user selection of characters. In some scenarios, font identification program 300 execute the auto-insertion of a font ligature string in the background (e.g., not visible to a user).

In another embodiment, font identification program 300 inserts a font ligature string based on ASCII characters. In some embodiments, font identification program 300 auto-inserts a font ligature string based on a user preference associated with font library 140. In other embodiments, font identification program 300 auto-inserts a font ligature string based on a user preference and/or information dictated by font library 155.

Referring to decision step 301, responsive to determining that a font analysis program is not utilized (No branch, decision step 301), font identification program 300 selects accesses text for font analysis via an editing mode (step 305).

In step 305, font identification program 300 accesses text for font analysis via an editing mode. In one embodiment, font identification program 300 activates an editing mode (e.g., executes an editing program) associated with an electronic document identified by a user. In an example, font identification program 300 may activate a web browser plug-in to edit a webpage selected by a user of user device 120. In another example, font identification program 300 may activate a desktop publishing program to edit a webpage. In another example, selecting a digital slideshow, font identification program 300 activates a presentation software program to edit the digital slideshow.

In another embodiment, font identification program 300 determines that a user is accessing (e.g., viewing) an electronic document via a program that presents the electronic document in an editable mode. In an example, font identification program 300 determines that a user activates (e.g., a hot-key combination) that invokes an instance of font identification program 300. Font identification program 300 may monitor an electronic document accessed by a user to determine which string of text is selected by a user. In an alternative embodiment, font identification program 300 may monitor an electronic document accessed via an editing mode to identify a custom ligature string that is inserted within a string of text selected by a user.

In step 307, font identification program 300 inserts a character string defined for a font ligature. In one embodiment, font identification program 300 inserts a character string defined for a font ligature (e.g., a font ligature string) based on a user preference associated with font library 140 based on an insertion point within a string of text of an electronic document. In another embodiment, font identification program 300 inserts a font ligature string based on a user preference and/or information dictated by font library 155. Font identification program 300 inserts a font ligature string based on an insertion point within a string of text of an electronic document. In some embodiments, font identification program 300 determines that a user inserts a font ligature string (e.g., a custom ligature string) within an electronic document. In various embodiments, font identification program 300 dictates that an inserted font ligature string is comprised of ASCII characters.

In step 308, font identification program 300 detects an inserted character string of a font ligature. In one embodiment, font identification program 300 detects an inserted character string of a font ligature (e.g., a font ligature string) within an electronic document. In a further embodiment, font identification program 300 detects two or more instances of a font ligature string. Font identification program 300 may detect and identify the two or more instances of a font ligature string within: the same electronic document, different electronic documents, or a combination thereof. In addition, font identification program 300 determines metadata associated with characters (e.g., text) that includes a font ligature string. In an example (referring to FIG. 4, text 410), font identification program 300 determines the metadata associated with the "f" of the word "for."

In an alternative embodiment, font identification program 300 detects an inserted character string of a font ligature within a portion of an electronic document copied to a graphical user interface element (e.g., a GUI associated with font analysis program 130).

In step 310, font identification program 300 displays text that includes a glyph substitution of a font ligature for an inserted character string. In one embodiment, font identification program 300 displays (e.g., renders) an electronic document that includes one or more glyphs based on font names based on one or more glyph substitution rules. In one scenario, font identification program 300 utilizes a program (e.g., a web browser, a word processor, a presentation software, etc.) that executes on user device 120.

In an alternative embodiment, font identification program 300 determines that a font ligature string cannot be inserted within an electronic document. Font identification program 300 utilizes a graphical user interface element (e.g., a GUI associated with font analysis program 130) to render (e.g., display) a copied portion of an electronic document that includes characters selected by a user for font analysis and a glyph that depicts the font name corresponding to a character of the selected characters. In one scenario, font identification program 300 displays a glyph that depicts the font name corresponding to a character of a user selection of characters among the selection of characters based on a user preference and/or one or more rules (e.g., at an insertion point). In another scenario, font identification program 300 displays a glyph that depicts the font name corresponding to a character of a user selection of characters based on a special ligature character string and a glyph substitution rule. In an example, (Referring to FIG. 4), font identification program 300 may dictate that a character that proceeds a font ligature string is included in a glyph substitution as illustrated by special ligature character string 451. Still referring to FIG. 4, font identification program 300 may utilize this glyph substitution scheme to display string 462 within the graphical user interface element.

Referring to step 310 in further embodiment, if font identification program 300 cannot activate a ligature substitution based on fonts available within font library 140, then font identification program 300 may communicate with server 150 to obtain a ligature substitution from a font with font library 155. In a further embodiment, font identification program 300 and/or a font analysis program (e.g., font analysis program 130, a widget) may enable a user to save a portion of the displayed text to a directory location on user device 120. In an example (referring to FIG. 4), font identification program 300 may enable a user to store output 460 to user device 120. In another example (referring to FIG. 4), font identification program 300 may enable a user to store string 462 to user device 120. A user may utilizes font identification program 300 to generate a plurality of instances of output 460, based on various text samples obtained from various electronic documents (not shown). Subsequently, a user may determine (e.g., with a font management program) which fonts identified within the plurality of stored instances of output 460 are included in font library 140 of user device 120 and which fonts are not included in font library 140. A user may access (e.g., download) one or more fonts not included in font library 140 from font library 155 on server 150 via network 110.

Figure 4:
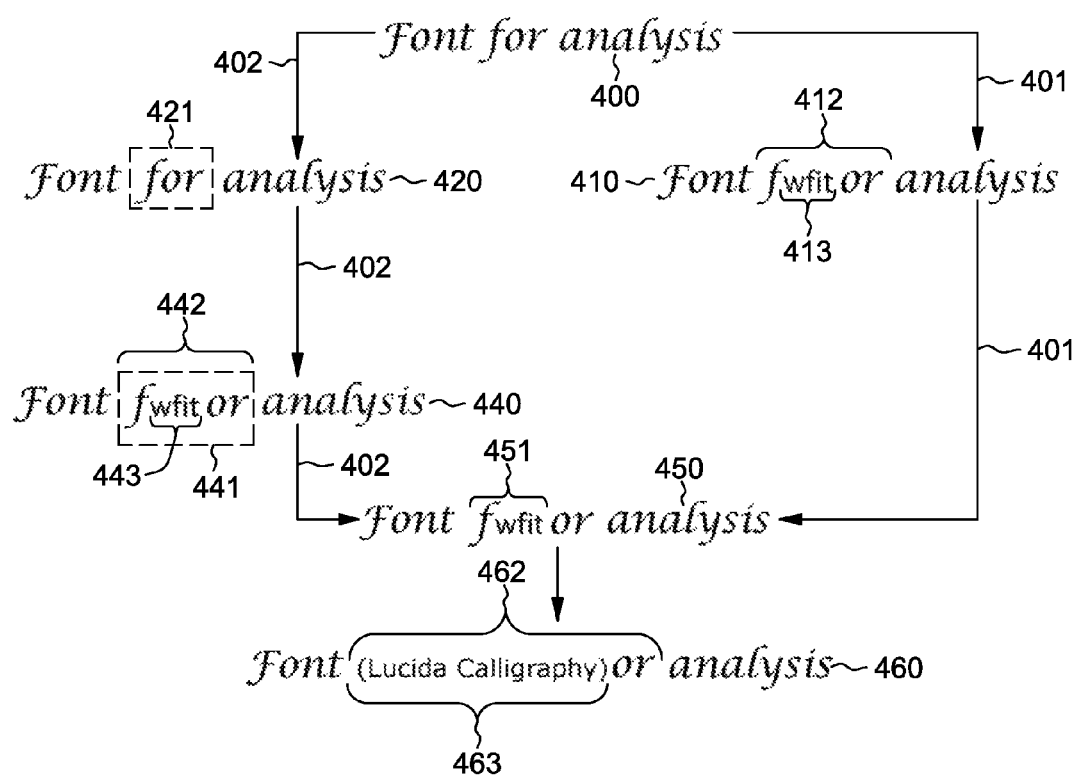
FIG. 4 depicts an illustrative example of utilizing a font identification program to identify a font within a string of characters, in accordance with an embodiment of the present invention.

FIG. 4 is an illustration depicting an example embodiment, utilizing a font identification program to identify a font within an electronic document, in accordance with an embodiment of the present invention.

Sample text 400 is an illustrative example of a font. Sample text 400 may depict a font included in an electronic (e.g., digital) document, such as, but not limited to a webpage, a presentation, a brochure, an e-mail, etc.

Path 401 is based on not utilizing a font analysis program (e.g., font analysis program 130, a font widget, etc.) (Referring to FIG. 3, No branch of decision step 301).

Text 410 includes sample text 400 and font ligature string 413. In this illustrative example, font ligature string 413 is comprised of four characters "wfit" (e.g., "what font is this"). In an example, a user manually inserts, types, and/or pastes font ligature string 413 (referring to FIG. 3, step 307) after the "f" character of the second word (i.e., for) of sample text 400. In an embodiment, an electronic document (not shown) is in an editable state (referring to FIG. 3, step 305)

that enables inclusion (e.g., insertion, pasting, typing, etc.) of font ligature string 413 within sample text 400, such that character string 412 is generated. In some embodiments, font ligature string 413 is depicted based on a font that is different from the font associated with sample text 400. In other embodiments, font ligature string 413 is depicted as the font of sample text 400.

Path 402 is based on utilizing a font analysis program (e.g., font analysis program 130, a font widget, etc.) (Referring to FIG. 3, Yes branch of decision step 301).

Text 420 is comprised of sample text 400 with the second word of sample text 400, "for" selected (e.g., highlighted, double mouse-clicked, etc.) by a user accessing an electronic document, such as a webpage, e-mail, presentation, etc. In an embodiment, selected character area 421 (e.g., dashed box) encompasses the word "for" of sample text 400. In another embodiment, a font analysis program (e.g., font analysis program 130, a font widget, etc.) is utilized to define selected character area 421 that identifies the text, which in turn identifies a font (e.g., a font name).

In an embodiment, text 440 exists in the background of (e.g., within, internal to) a font analysis program (e.g., font analysis program 130, a font widget). In another embodiment, text 440 is visible to a user of user device 120 via a UI (e.g., UI 122) that is associated with a font analysis program (e.g., font analysis program 130, a font widget). In some embodiments, a font analysis program utilizes a predefined string of character (e.g., "wfit") as font ligature string 443. In another embodiment, character string 442 depicts an internalized (e.g., not displayed) version of the auto-insertion of font ligature string 443 (referring to FIG. 3, step 304) within characters comprising selected character area 421. In various embodiments, text 440 is displayed. In one scenario, text 440 is displayed within an electronic document that includes the selected text (e.g., selected character area 421). In another scenario, text 440 is displayed within a graphic element, such a window or UI associated with a font analysis program.

In other embodiments, a font analysis program (e.g., font analysis program 130, a font widget) inserts font ligature string 443. In one scenario, font ligature string 443 is auto-inserted after the first character of a selection of text. In various scenarios, the auto-insertion of font ligature string 443 is not constrained to a dictated character position within a selected (e.g., dashed box area) string of characters (e.g., text). In an alternative example, font ligature string 443 may be inserted after the last character of selected character area 421, such as after the "r" in "for." In some embodiments, font ligature string 443 is depicted based on a font that is different from the font associated with sample text 400. In another embodiment, font ligature string 443 is depicted based on the font of sample text 400.

Transitional text 450 includes sample text 400 and special ligature character string 451. In some embodiments, transitional text 450 depicts an internalized (e.g., not displayed) version of sample text 400 that includes an inserted font ligature string (e.g., font ligature string 413, font ligature string 443). In various embodiment, font identification program 300 combines utilizes one or more rules (e.g., contextual substitutions, wildcards, placeholder definitions, a lookup rule, etc.) that are associated with ligature and/or glyph substitutions. In one embodiment, the "f" character that precedes font ligature string 413 is combined with font ligature string 413 to generate special ligature character string 451. In another embodiment, the "f" character that precedes font ligature string 443 is combined with font ligature string 443 to generate special ligature character string 451. In some embodiments, special ligature character string 451 utilities metadata associated the "f" character of the word "for" to ensure that the font associated to the "f" is the font identified by font identification program 300. In other embodiments, font identification program 300 may utilize one or more other rules that selects the "o" that follows an inserted font ligature string (e.g., font ligature string 413) to generate special ligature character string 451.

In an alternative embodiment, font identification program 300 may utilize a custom ligature, such as font ligature string 413 or font ligature string 443 to determine a name of the font of sample text 400 without analyzing transitional text 450. In an example, a font within font library 140 (previously discussed in FIG. 1) has a glyph substitution table based on a font ligature string as opposed to a special ligature character string (e.g., special ligature character string 451). In this alternative embodiment, font identification program 300 generalizes the metadata associated with a selected or edited portion of text to determine a name for the font of the selected or edited portion of text.

Output 460 includes sample text 400 and glyph 463 within string 462. In an embodiment, special ligature character string 451 is defined within font library 140 (previously discussed in FIG. 1) that corresponds, via a glyph substitution table, to glyph 463. In some embodiment, output 460 is displayed within an electronic document that includes the selected text (e.g., selected character area 421). In other embodiments, output 460 is displayed within a graphic element, such a window or UI associated with a font analysis program. In an embodiment, output 460 displays with glyph 463 replacing special ligature character string 451. In an alternative embodiment, output 460 displays with glyph 463 replacing a font ligature string (e.g., font ligature string 413) and preceded by the character "f" of the word "for."

In an illustrative example, sample text 400 is based on font (e.g., font name) "Lucida Calligraphy" and the corresponding glyph (e.g., glyph 463) are defined in a font within font library 140 as "(Lucida Calligraphy)." In one illustrative example, special ligature character string 451 (i.e., fwfit) is replaced with glyph 463 for inclusion in text 410 to produce displayed output 460 (referring to FIG. 3, step 310). In another illustrative example, special ligature character string 451 (i.e., fwfit) is replaced with glyph 463 for inclusion within selected text area 441 to produce displayed output 460 (referring to FIG. 3, step 310). In various embodiments however, glyph 463 may be an image (e.g., a bitmap) of text that is unaffected by insertion within sample text 400. In some embodiments, glyph 463 is comprised of characters (e.g., text, symbols, etc.). In one scenario, glyph 463 may display as the font of sample text 400. In another scenario, glyph 463 may display as a font associated with an application that displays an electronic document that includes sample text 400. In an example, glyph 463 may display as a font defined in a CSS associated with a web browser. In an alternative embodiment, glyph 463 is comprised of text that is displayed based on metadata associated a portion of text subject to font analysis.

Figure 5:
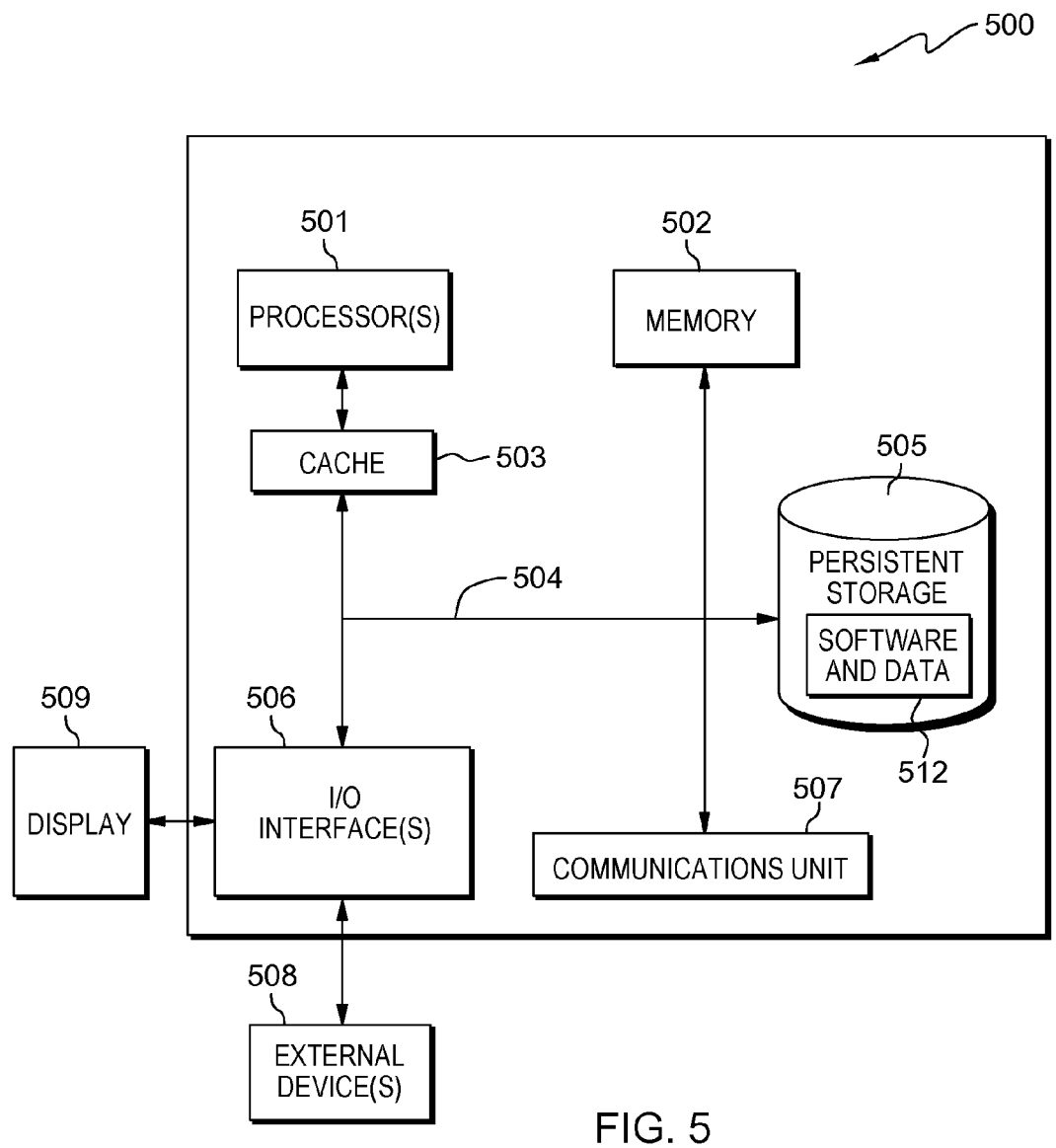
FIG. 5 is a block diagram of components of a computer, in accordance with an embodiment of the present invention.

FIG. 5 depicts computer system 500, which is representative of computer system 102, user device 120, and server 150. Computer system 500 is an example of a system that includes software and data 512. Computer system 500 includes processor(s) 501, memory 502, cache 503, persistent storage 505, communications unit 507, I/O interface(s) 506, and communications fabric 504. Communications fabric 504 provides communications between memory 502, cache 503, persistent storage 505, communications unit 507, and I/O interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processor(s) 501 by holding recently accessed data, and data near recently accessed data, from memory 502.

Program instructions and data used to practice embodiments of the present invention may be stored in persistent storage 505 and in memory 502 for execution by one or more of the respective processor(s) 501 via cache 503. In an embodiment, persistent storage 505 includes a magnetic hard disk drive. Alternatively, or in addition to a magnetic hard disk drive, persistent storage 505 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505. Software and data 512 are stored in persistent storage 505 for access and/or execution by one or more of the respective processor(s) 501 via cache 503 and one or more memories of memory 502. With respect to user device 120, software and data 512 includes user interface 122, font analysis program 130, font library 140, ligature definition program 200, font identification program 300, and various programs (not shown). With respect to server 150, software and data 512 includes font library 155 and various information and programs (not shown).

Communications unit 507, in these examples, provides for communications with other data processing systems or devices, including resources of computer system 102, user device 120, and server 150. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507.

I/O interface(s) 506 allows for input and output of data with other devices that may be connected to each computer system. For example, I/O interface(s) 506 may provide a connection to external device(s) 508, such as a keyboard, a keypad, a touch screen, and/or some other suitable input device. External device(s) 508 can also include portable computer readable storage media, such as, for example, thumb drives, portable optical or magnetic disks, and memory cards. Software and data 512 used to practice embodiments of the present invention can be stored on such portable computer readable storage media and can be loaded onto persistent storage 505 via I/O interface(s) 506. I/O interface(s) 506 also connect to display 509.

Display 509 provides a mechanism to display data to a user and may be, for example, a computer monitor. Display 509 can also function as a touch screen, such as the display of a tablet computer or a smartphone.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for identifying a font displayed within an electronic document, the method comprising:
    identifying, by one or more processors, an insertion of a string of two or more characters among a selected string of characters within an electronic document, wherein the two or more characters correspond to a custom ligature, and wherein the custom ligature is associated with the selected string of characters;
    accessing, by one or more processors, one or more font libraries associated with the electronic document;
    identifying, by one or more processors, a font file within the one or more font libraries that corresponds to the selected string of characters within the electronic document;
    identifying, by one or more processors, a glyph within the identified font file that corresponds to the custom ligature associated with the selected string of characters;
    substituting, by one or more processors, the identified glyph into the electronic document to replace at least the custom ligature associated with the selected string of characters; and
    displaying, by one or more processors, the substituted glyph within the electronic document, wherein the substituted glyph depicts a name of the font file corresponding to the selected string of characters.

2. The method of claim 1, wherein the identified font file includes the custom ligature and the glyph that corresponds to the custom ligature.

3. The method of claim 1, further comprising:
    identifying, by one or more processors, a user selection of an insertion point after one character within the electronic document; and
    inserting, by one or more processors, the custom ligature within the electronic document at the insertion point selected by the user, wherein the custom ligature is associated with at least one character within the electronic document adjacent to the insertion point for the custom ligature.

4. The method of claim 1, further comprising:
    determining, by one or more processors, that the custom ligature cannot be inserted among a user selected string of characters within the electronic document;
    copying, by one or more processors, a portion of the electronic document to a graphical user interface, wherein the copied portion of the electronic document includes at least the user selected string of characters;

inserting, by one or more processors, the custom ligature among the user selected string of characters;

substituting, by one or more processors, the identified glyph to replace at least the custom ligature associated with the selected string of characters; and displaying, by one or more processors, at least the substituted glyph among the user selected string of characters copied to the graphical user interface, wherein the substitute glyph depicts the name of the font file corresponding to the selected string of characters.

5. The method of claim 1, further comprising:

determining, by one or more processors, that the identified font file includes a glyph substitution rule, wherein the glyph substitution rule dictates that a character of the at selected string of characters within the electronic document that is associated with the custom ligature is utilized to determine the glyph substitution; and displaying, by one or more processors, the substituted glyph within the electronic document based on the glyph substitution rule.

6. The method of claim 1, wherein identifying the font file that corresponds to the selected string of characters at within the electronic document that is associated with the custom ligature is based, at least in part, on metadata associated with the at least one character of the selected string of characters that is associated with the custom ligature.

7. A computer program product for identifying a font displayed within an electronic document, the computer program product comprising:

one or more computer readable storage media and program instructions stored on the one or more computer readable storage media, the program instructions readable/executable by one or more computer processors, the program instructions comprising:

program instructions to identify an insertion of a string of two or more characters among a selected string of characters within an electronic document, wherein the two or more characters correspond to a custom ligature, and wherein the custom ligature is associated with the selected string of characters;

program instructions to access one or more font libraries associated with the electronic document;

program instructions to identify a font file within the one or more font libraries that corresponds to the selected string of characters within the electronic document;

program instructions to identify a glyph within the identified font file that corresponds to the custom ligature associated with the selected string of characters;

program instructions to substitute the identified glyph into the electronic document to replace at least the custom ligature associated with the selected string of characters and program instructions to display the substituted glyph within the electronic document, wherein the substituted glyph depicts a name of the font file corresponding to the selected string of characters.

8. The computer program product of claim 7, wherein the identified font file includes the custom ligature and the glyph that corresponds to the custom ligature.

9. The computer program product of claim 7, further comprising program instructions, stored on the one or more computer readable storage media, to:

identify a user selection of an insertion point after one character within the electronic document; and insert the custom ligature within the electronic document at the insertion point selected by the user, wherein the custom ligature is associated with at least one character within the electronic document adjacent to the insertion point for the custom ligature.

10. The computer program product of claim 7, further comprising program instructions, stored on the one or more computer readable storage media, to:

determine that the custom ligature cannot be inserted among a user selected string of characters within the electronic document;

copy a portion of the electronic document to a graphical user interface, wherein the copied portion of the electronic document includes at least the user selected string of characters;

insert the custom ligature among the user selected string of characters;

substitute the identified glyph to replace at least the custom ligature associated with the selected string of characters; and display, at least the substituted glyph among the user selected string of characters selection of one or more characters copied to the graphical user interface, wherein the substitute glyph depicts the name of the font file corresponding to the selected string of characters.

11. The computer program product of claim 7, further comprising program instructions, stored on the one or more computer readable storage media, to:

determine that the identified font file includes a glyph substitution rule, wherein the glyph substitution rule dictates that a character of the at selected string of characters within the electronic document that is associated with the custom ligature is utilized to determine the glyph substitution; and display the substituted glyph within the electronic document based on the glyph substitution rule.

12. The computer program product of claim 7, wherein program instructions to identify the font file that corresponds to the selected string of characters within the electronic document that is associated with the custom ligature is based, at least in part, on metadata associated with the at least one character of the selected string of characters that is associated with the custom ligature.

13. A computer system for identifying a font displayed within an electronic document, the computer system comprising:

one or more computer processors;

one or more computer readable storage media; and program instructions stored on the computer readable storage media having program instructions embodied therein, the program instructions readable/executable for execution by at least one of the one or more computer processors, the program instructions comprising:

program instructions to identify an insertion of a string of two or more characters among a selected string of characters that within an electronic document, wherein the two or more characters correspond to a custom ligature, and wherein the custom ligature is associated with the selected string of characters;

program instructions to access one or more font libraries associated with the electronic document;

program instructions to identify a font file within the one or more font libraries that corresponds to the selected string of characters within the electronic document;

program instructions to identify a glyph within the identified font file that corresponds to the custom ligature associated with the selected string of characters;

program instructions to substitute the identified glyph into the electronic document to replace at least the custom ligature associated with the selected string of characters and program instructions to display the substituted glyph within the electronic document, wherein the substituted glyph depicts a name of the font file corresponding to the selected string of characters.

14. The computer system of claim 13, wherein the identified font file includes the custom ligature and the glyph that corresponds to the custom ligature.

15. The computer system of claim 13, further comprising program instructions, stored on the one or more computer readable storage media, to:

identify a user selection of an insertion point after one character within the electronic document; and insert the custom ligature within the electronic document at the insertion point selected by the user, wherein the custom ligature is associated with at least one character within the electronic document adjacent to the insertion point for the custom ligature.

16. The computer system of claim 13, further comprising program instructions, stored on the one or more computer readable storage media, to:

determine that the custom ligature cannot be inserted among a user selected string of characters within the electronic document;

copy a portion of the electronic document to a graphical user interface, wherein the copied portion of the electronic document includes at least the user selected string of characters;

insert the custom ligature among the user selected string of characters;

substitute the identified glyph to replace at least the custom ligature associated with the selected string of characters; and display, at least the substituted glyph among the user selected string of characters selection of one or more characters copied to the graphical user interface, wherein the substitute glyph depicts the name of the font file corresponding to the selected string of characters.

17. The computer system of claim 13, further comprising program instructions, stored on the one or more computer readable storage media, to:

determine that the identified font file includes a glyph substitution rule, wherein the glyph substitution rule dictates that a character of the at selected string of characters within the electronic document that is associated with the custom ligature is utilized to determine the glyph substitution; and display the substituted glyph within the electronic document based on the glyph substitution rule.

18. The computer system of claim 13, wherein program instructions to identify the font file that corresponds to the selected string of characters within the electronic document that is associated with the custom ligature is based, at least in part, on metadata associated with the at least one character of the selected string of characters that is associated with the custom ligature.

19. The method of claim 5, wherein a glyph substitution rule is selected from the group of rule consisting of: associating the character preceding the inserted custom ligature with the custom ligature, associating the character following to the inserted custom ligature with the custom ligature, and combining the character associated the inserted custom ligature with the custom ligature.

\* \* \* \* \*